United States Patent [19]

Foster et al.

[11] Patent Number: 5,501,221
[45] Date of Patent: Mar. 26, 1996

[54] TIME GAIN COMPENSATION IMPLEMENTATION

[75] Inventors: Steven G. Foster, Greenfield; Mark H. Wheeler, Pewaukee, both of Wis.

[73] Assignee: General Electric Company, Milwaukee, Wis.

[21] Appl. No.: 343,161

[22] Filed: Nov. 22, 1994

[51] Int. Cl.[6] .................................................. A61B 8/00
[52] U.S. Cl. ......................... 128/660.06; 73/620
[58] Field of Search .................. 128/660.01, 660.06, 128/660.07, 662.03; 73/619, 620, 621, 625, 626, 631, 629, 633, 599, 602

[56] References Cited

U.S. PATENT DOCUMENTS

| | | | |
|---|---|---|---|
| 4,520,671 | 6/1985 | Hardin | 73/620 |
| 4,621,645 | 11/1986 | Flax | 128/660.06 |
| 4,733,668 | 3/1988 | Torrence | 128/660.01 |

Primary Examiner—George Manuel
Attorney, Agent, or Firm—B. Joan Haushalter; John H. Pilarski

[57] ABSTRACT

A time gain compensation technique is applicable for use with ultrasound imaging systems, including systems having digital architecture. The time gain compensation apparatus of the present invention comprises a time gain compensation curve generator and the ability to drive the time gain compensation curve generator to provide digital generation of the time gain compensation curve. Digital generation of the time gain compensation curve is achieved by an initial gain and data represented by a series of slopes and associated time-dependent break-points.

5 Claims, 1 Drawing Sheet

TIME GAIN COMPENSATION IMPLEMENTATION

TECHNICAL FIELD

The present invention relates to ultrasound imaging and, more particularly, to digital generation of a time gain compensation curve by means of a series of piecewise continuous line segments in an ultrasound imaging apparatus.

BACKGROUND ART

Ultrasonic echoes from deliberately launched diagnostic sound waves into tissue are attenuated in proportion to the distance that the sound waves must travel to reach the reflector, plus the distance that the resulting echoes must travel back to reach the receiver. Since sound waves are attenuated as they pass through the human body, the deeper the penetration, the greater the attenuation. Consequently, the strength of the received echoes becomes weaker with increasing depth and time. This is undesirable because it limits the dynamic range of the echo strength, i.e., the dynamic range over which the echoes can be heard.

To compensate for the diminishing echo strength, most medical ultrasound systems use some sort of Time Gain Compensation (TGC). Since the attenuation rate increases proportionally to the depth of the signal received, the time gain compensation must compensate for a reduced signal as the sound waves penetrate deeper into the body and are returned to the receiving transducers. TGC is a method of increasing the receiver gain as echoes are received from deeper tissues or equivalently with time. Existing TGC's are analog, since the architecture of existing medical ultrasound systems is analog. However, ultrasound imaging systems are being developed which include digital architecture.

It would be desirable then to have a time gain compensation technique for use with any ultrasound imaging system, including an ultrasound imaging system which incorporates digital architecture.

SUMMARY OF THE INVENTION

The present invention provides a time gain compensation means for compensating for the diminishing echo strength in an ultrasound imaging system which includes digital architecture. The time gain compensation technique of the present invention increases the receiver gain as echoes are received from deeper tissues or equivalently with time. The TGC generator of the present invention is compatible with the architecture of medical ultrasound imaging systems, including systems which includes digital architecture.

In accordance with one aspect of the present invention, a time gain compensation technique for use with ultrasound imaging systems comprises a TGC curve generator and a means for driving the TGC curve generator to provide digital generation of the time gain compensation curve. Digital generation of the time gain compensation curve is achieved by an initial gain and data represented by a series of slopes and associated time-dependent break-points.

Accordingly, it is an object of the present invention to provide a TGC generator. It is a further object to provide such a TGC generator which is compatible with the architecture of medical ultrasound systems. It is yet another object of the present invention to provide such a TGC generator which is compatible with the architecture of systems which incorporate digital architecture.

Other objects and advantages of the invention will be apparent from the following description, the accompanying drawings and the appended claims.

DETAILED DESCRIPTION OF THE PREFERRED EMBODIMENTS

Figure 1:
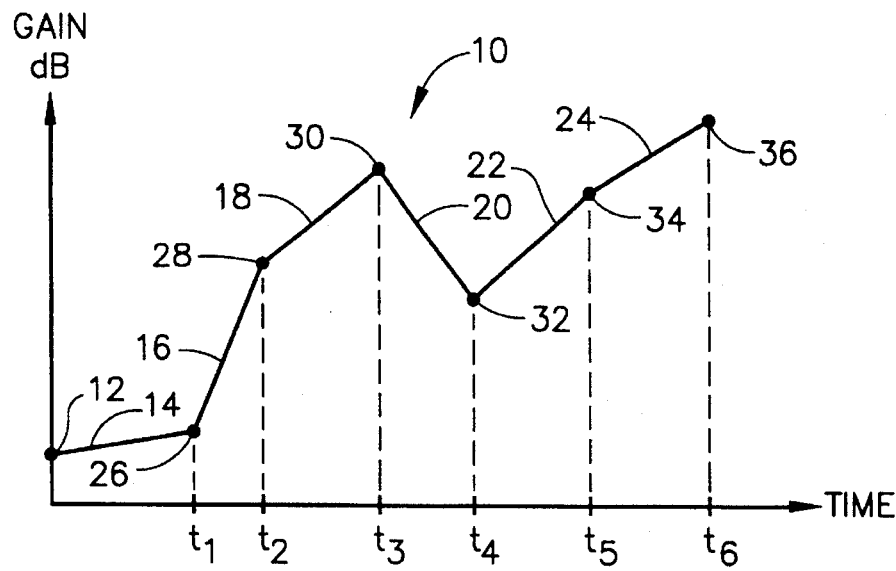
FIG. 1 is a piece-wise, continuous graphical representation of time gain compensation, in accordance with the present invention.

Referring to the drawings, a desired TGC curve 10 in FIG. 1, is specified by an initial gain 12 followed by data represented by a series of slopes 14, 16, 18, 20, 22, 24 and associated break points 26, 28, 30, 32, 34, 36. Each break point 26, 28, 30, 32, 34, 36 is specified in units of time as $t_1, t_2, t_3, t_4, t_5, t_6$, respectively, and indicates the image depth at that point in time. The gain is measured in dB, and increases as time (and distance through the body) progresses. The x-axis of the curve 10 represents depth of the vector or the time it takes from the start of receive to the end of the current depth of the image. The y-axis represents the gain value in decibels applied to the receive vector.

The tendency is for the gain to constantly increase, as generally indicated in curve 10. However, as represented by decreasing slope 20, the ultrasonic sound waves occasionally hit a more reflective region in the body. The sonographer then adjusts the gain according to how the image is seen. A PGC (preset gain compensation) gain is applied to the vector as it is processed to compensate for tissue attenuation. The PGC gain automatically adjusts for tissue attenuation as sound waves travel through the body. The PGC gain curve slope is defined as tissue attenuation multiplied by probe frequency multiplied by speed of sound. The PGC gain increases linearly and is directly proportional to the depth of the vector received, and is not controlled by a user control. The PGC gain curve is a constant slope curve which, based on the location of a plurality of TGC pots, is used to derive the TGC curve. Typically, there are eight TGC pots and a gain knob, controllable by the sonographer, to control the gain applied to the received signal. The TGC pots control gain at a particular depth along the received vector, which is defined as the TGC gain. The gain knob controls the base gain, or system gain. The TGC curve is derived directly from the placement of the TGC pots, and an adjustment to the PGC curve.

Figure 2:
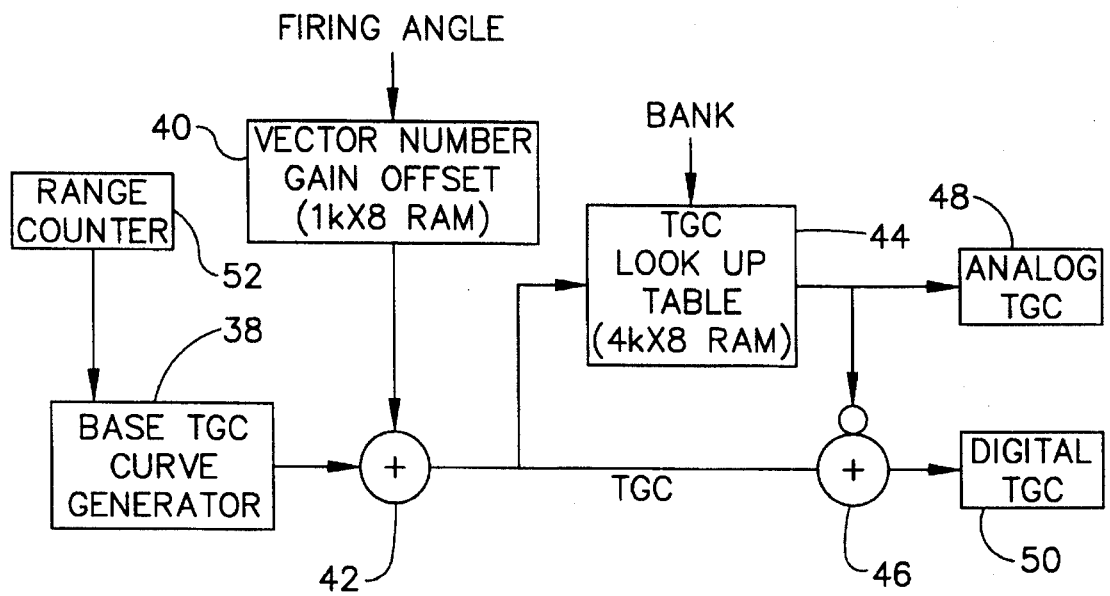
FIG. 2 is a schematic block diagram of a TGC generator of the present invention for generating the graphical representation illustrated in FIG. 1.

The block diagram of the electronics which generate the TGC curve 10 of FIG. 1 is illustrated in FIG. 2. The TGC curve 10 starts from the system gain setting 12 with the first pot added to or subtracted from the system gain value. Both the system gain setting and the location of the first TGC pot determine the starting decibel level of the beginning of the receive vector at time/depth of zero. A base TGC curve generator 38 is associated with a range counter 52 which keeps track of the range or depth from which the echoes are coming. The base TGC curve generator makes the base curve from the initial gain 12, and increments the curve 10 by the slope 14 value periodically in time until the first break point 26 is reached. At this point, the new slope 16 is provided and the TGC curve is incremented by this new value. The base curve can be defined as the curve generated by the initial gain and the series of slopes and associated break points.

An offset from a vector number gain offset RAM 40 is added, using adder 42, to the base. The offset is angle dependent. That is, if the sound waves are being fired straight ahead, the offset is different, usually less, than when the sound waves are being fired at an angle.

If the ultrasound imaging equipment comprises digital architecture, the TGC curve is divided into TGC for the analog circuitry and TGC for the digital circuitry. This is accomplished using a TGC lookup table 44 and a subtractor 46. The lookup table, comprised generally of a memory having predetermined values therein, translates values of TGC into TGC for the analog sections, determining the amount of gain to be apportioned to the analog circuitry. Then the analog TGC 48 is subtracted off from the TGC leaving the remainder as digital TGC 50.

Continuing with FIG. 2, the bus width of the TGC signal is expressed in a ±x.y format, where ± is the sign bit if used, x is the number of binary digits to the left of the decimal point, and y is the number of binary digits to the right of the decimal point. For example, the number $+63.0625_{BASE\ 10}$ would be expressed as $0111111.00010000_{BINARY}$.

The invention has been described in detail with particular reference to certain preferred embodiments thereof, but it will be understood that modifications and variations can be effected within the spirit and scope of the invention.

We claim:

1. A time gain compensation apparatus for use with ultrasound imaging systems comprising:

a TGC curve generator;

a means for driving the TGC curve generator to generate a base curve, the base curve defined by an initial gain and data represented by a series of slopes and associated time-dependent break-points, the TGC curve generator further having an associated vector number gain offset for providing an offset value to be added to the base curve, to provide digital generation of the time gain compensation curve.

2. A time gain compensation apparatus as claimed in claim 1 further comprising a summer for summing the vector number gain offset and a base curve.

3. A time gain compensation apparatus as claimed in claim 2 wherein the base curve comprises the initial gain and the series of slopes and associated time-dependent break-points.

4. A time gain compensation apparatus as claimed in claim 1 further comprising means for apportioning the TGC to analog circuitry and to digital circuitry.

5. A time gain compensation apparatus as claimed in claim 4 wherein the means for apportioning comprises:

a TGC lookup table for translating values of TGC into analog TGC associated with the analog circuitry; and a subtractor for subtracting off the analog TGC from the TGC to provide the digital TGC associated with digital circuitry.

* * * * *